United States Patent [19]

Garland et al.

[11] Patent Number: 5,056,301
[45] Date of Patent: Oct. 15, 1991

[54] DEVICE FOR CONNECTING A SHAFT TO A HARNESS

[76] Inventors: Carl C. Garland, 8550 Frandor, Northville, Mich. 48167; M. Gaylord Boutilier, R.R. #2, Box 3980, Jay, Me. 04239

[21] Appl. No.: 414,146

[22] Filed: Sep. 28, 1989

[51] Int. Cl.[5] .............................. B68B 1/00; B62C 5/02
[52] U.S. Cl. ................................................ 54/2; 54/50
[58] Field of Search ................... 54/2, 50; 280/75, 76

[56] References Cited

U.S. PATENT DOCUMENTS

| 324,876 | 8/1885 | Moyer | 54/50 |
|---------|--------|-------|-------|
| 1,354,410 | 9/1920 | McCarthy . | |
| 4,392,663 | 7/1983 | Forslund | 54/2 X |
| 4,473,991 | 10/1984 | La Mura et al. | 54/2 |
| 4,986,059 | 1/1991 | Boutilier | 54/2 |

Primary Examiner—Robert P. Swiatek
Attorney, Agent, or Firm—David A. Greenlee

[57] ABSTRACT

A sulky cart, preferably leaving shafts with off-set forward end portions, is releasably attached to an off-set elongated sleeve member with a connector assembly on the forward end of the sleeve member. The connector assembly contains a rotatable ball with a central aperture for sliding over a harness pin secured to and extending from a harness saddle. The harness pin is provided near its outer end with a normally locked locking device, so that the cast can be hitched to the saddle harness by sliding the harness pin and locking device through the central aperture in the ball.

10 Claims, 2 Drawing Sheets

DEVICE FOR CONNECTING A SHAFT TO A HARNESS

FIELD OF THE INVENTION

This invention relates to apparatus for connecting the shafts of a cart or the like to a harness, particularly for attaching the shafts of a racing sulky to a harness. More particularly, this invention relates to a device for connecting such a shaft to a harness pin secured to a harness.

BACKGROUND OF THE INVENTION

In harness racing, a race horse pulls a two-wheeled cart, or sulky, having a pair of shafts which are attached to a harness saddle circling the horse's body. A breast strap extending across the horse's chest and attached to the saddle or to the shafts by traces may also be used. As the horse runs, it rolls from side to side, i.e., its weight shifts from side to side. This motion is transmitted to the sulky, tending to cause the sulky to fish-tail, or zig-zag, on the track, and to waste the horse's energy.

A thimble over the end of each shaft and attached by a strap to the harness may be used to transmit the horse's motion to the sulky. A safety strap attached to the saddle and wrapped around the shaft is often used to ensure that the shafts do not become disconnected from the saddle. Both of these latter devices also contribute to the fish-tailing effect.

It is also desirable to reduce or eliminate skidding of the sulky on the tracks, which tends to occur when making a turn or changing lanes. The three connections referred to above create a barrier to the ability of the horse and sulky to negotiate a turn, since all the force is directed in a straight line Thus, the horse upon entering a turn at a high rate of speed tends to be forced ahead and toward the outside, and, at the same time, into a more level position even though the turn is banked. This contributes to the loss of distance, time and racing position Attempts have been made to overcome the above-noted disadvantages of the conventional systems for hitching a horse to a sulky by using various ball-joint arrangements. U.S. Pat. No. 4,662,157, for example, discloses a coupling assembly for securing the shafts of a sulky to a saddle wherein a pair of coupling frames are secured to a saddle and are connected to the shafts through a coupling block having a ball-and-socket permitting rotational movement of the shaft relative to the saddle. Each coupling block is secured to a coupling frame by a coupling pin and cotter pin. U.S. Pat. No. 4,326,367 also discloses the use of a pair of ball joints in a device for joining the shafts of a sulky to the harness of a horse. U.S. Pat. No. 4,473,991 discloses a harness connector device wherein a pin secured to the harness fits into a first ball joint connected through a linking member to a second ball joint, which in turn is connected to a shaft.

The conventional systems described in the above-mentioned patents, however, do not satisfactorily solve the problems of fish-tailing and skidding. For example, the last-named harness connector has been investigated and been found by drivers to fail to provide a sense of integration between the horse, sulky and driver. This is because the inclusion of two ball joints destroys the ability of the connection to transmit any feeling of the horse's movements and thus the ability to control the horse while trotting or pacing at any appreciable speed.

U.S. Pat. No. 4,073,000 discloses a so-called "single-hitch" sulky utilizing a yoke which overlies and is attached to the saddle of a horse harness. In practice, such a yoke has been connected to the sulky shafts by longitudinally adjustable sleeves, the posterior ends of which fit over the front ends of the sulky shafts. Such sleeves may be adjustably fitted over the sulky shaft to vary the distance from this connection to the cart. This type of hitch, however, has been found to cause instability, in that the sulky has a tendency to tip over.

In co-pending application Ser. No. 264,658, filed Oct. 27, 1988, by M. Gaylord Boutelier there is disclosed a device for connecting a sulky shaft to a harness. A harness pin assembly is fixedly mounted on a harness saddle and the harness pin projects outwardly from the saddle at an angle of approximately 90'. A releasable locking device on the harness pin is positioned intermediate the saddle and the outer end of the pin. A connector assembly, for releasably connecting the harness pin assembly to the shaft, comprises a housing member which can be secured to the shaft by straps or the like. The housing member is provided with a ball-retaining aperture, and a ball member is rotatably secured in the ball-retaining aperture and is provided with a cylindrical aperture through the center thereof, the aperture having a diameter adapted to receive the harness pin. A collar member extends from opposite sides of the ball member so as to limit the rotation of the ball member in the housing. The locking device is adapted to permit the harness pin to be inserted into the cylindrical aperture past the locking device when the locking device is in an unlocked position and then lock the ball member on the harness pin when the harness pin is in a normally locked position.

Use of the above Boutelier device permits vastly improved times and performances, and previously difficult to handle horses have been observed to race more evenly when such a device is used. It has now been determined by tests on the track that the present invention provides still further improvements in sulky and harness design and performance, and use of the present invention enables the driver to have still further improved control and feel during a race.

An object of the present invention is a simple, easy to use device for connecting a shaft of a sulky to a harness saddle which further reduces, fish-tailing and skidding of the sulky on the track.

An additional object of the present invention is such a device enabling improved handling on the corner without binding the horse or sulky. A further object is such a device enabling better control in getting out of hole.

A still further object is such a device which permits the shaft-harness connection to be made closer to the horse's body and which may be used with sulky shafts better conforming to the horse's body.

Other objects and advantages of the present invention will become apparent from the following description and accompanying drawings of a preferred embodiment thereof and from the manufacture and use of the invention.

SUMMARY OF THE INVENTION

To achieve the objects of the present invention there is provided a device for connecting a cart to a harness which device comprises an elongated member for connection to a harness, the elongated member having a forward portion with a forward end and an adjoining rear portion having a rear end remote from the forward portion. A connector assembly is provided for detachable connection to a harness pin which is secured on its inner end to a harness and extends outwardly at approximately 90' from the harness. The harness pin is provided with a locking device intermediate the harness and the outer end thereof. The locking device is provided with at least one retractable member which extends radially outward from the pin when in the locked position, but when retracted to the unlocked position does not project outwardly from the circumference of the pin. The connector assembly comprises a housing member affixed to the forward end of the forward portion of the elongated member, and the housing member is provided with a ball-retaining aperture means. A ball member is rotatably secured in the ball retaining aperture means and is provided with a core hole through the center thereof adapted to permit the harness pin and the locking device (when in the unlocked position) to be passe therethrough. A collar member coaxial with the core hole and extending from opposite sides of the ball member is provided to limit the rotational freedom of the ball member in the housing to a pre-selected degree. When the harness pin is passed into and through the core hole past the locking device and the locking device activated, the elongated member is releasably secured to the harness.

Preferably, the elongated member is a tubular sleeve, with a hollow rear portion adapted to receive the forward portion of one of the shafts. A number of spaced-apart openings are provided in the wall of the hollow portion, and when one or more of the openings are aligned with one or more corresponding holes in the sulky shaft, the sleeve can be secured to the shaft with one or more pins placed through the openings in the sleeve and shaft.

In an especially preferred embodiment of the present invention, the forward and rear portions of the elongated sleeve member are offset from, or disposed at an angle to, one another. That is, when the sleeve is fitted onto the shaft, the forward portion is angled both downwardly (toward the ground) and inwardly (toward the harness) from the major rear portion of the shaft extending from the sleeve to the sulky.

In another aspect, the present invention comprises a cart or the like having shafts, each with a forward end portion adapted to be inserted into the hollow rear portion of one of the sleeve members and a plurality of lateral throughholes spaced along the forward end portion of the shaft for alignment with a corresponding hole or holes in the sleeve member. Preferably, the forward end of each shaft is offset from the rear portion of the shaft as to angle therefrom downwardly and inwardly. Also it is preferred that the forward portion of the shaft has a cross-sectional configuration which substantially conforms to the cross-section of the hollow in the rear portion of the sleeve member, and the outside dimensions of the forward portion of the shaft cross-section are only slightly smaller than the inside dimensions of the hollow rear portion of the sleeve, so that a snug fit is provided when the shaft is inserted into the sleeve and the sleeve member is pinned onto the shaft to secure it thereon.

DESCRIPTION OF THE PREFERRED EMBODIMENT

Figure 1:
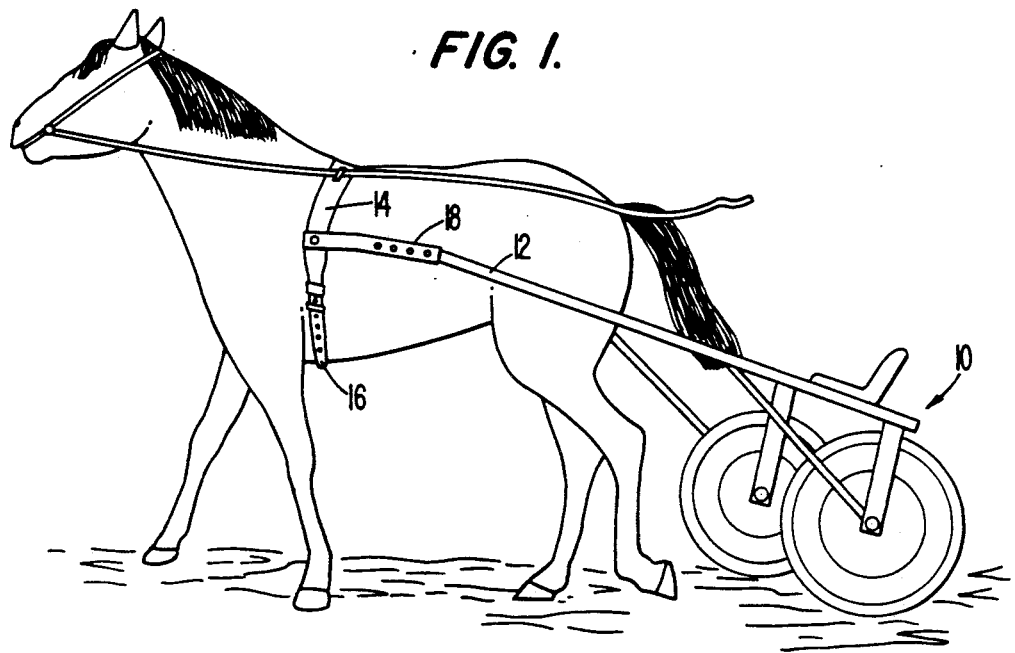
FIG. 1 is a sketch of a racing sulky and horse showing the attachment of the shafts of the sulky to the harness saddle on the horse in accordance with the present invention.

The present invention will be described referring to the accompanying drawings. As shown in FIG. 1, a two-wheeled racing sulky 10 has attached to it a pair of long shafts 12 extending forwardly toward a horse which pulls the sulky. The shafts 12 are laterally spaced from each other, one on either side of the horse.

A circumferential harness saddle 14 is secured on the horse by a girth strap 16 which is cinched around the barrel of the horse behind its front legs. In hitching the horse to the sulky, each shaft 12 is secured to the saddle 14 by the connecting device 18 of the present invention, which is hereinafter described.

Figure 2:
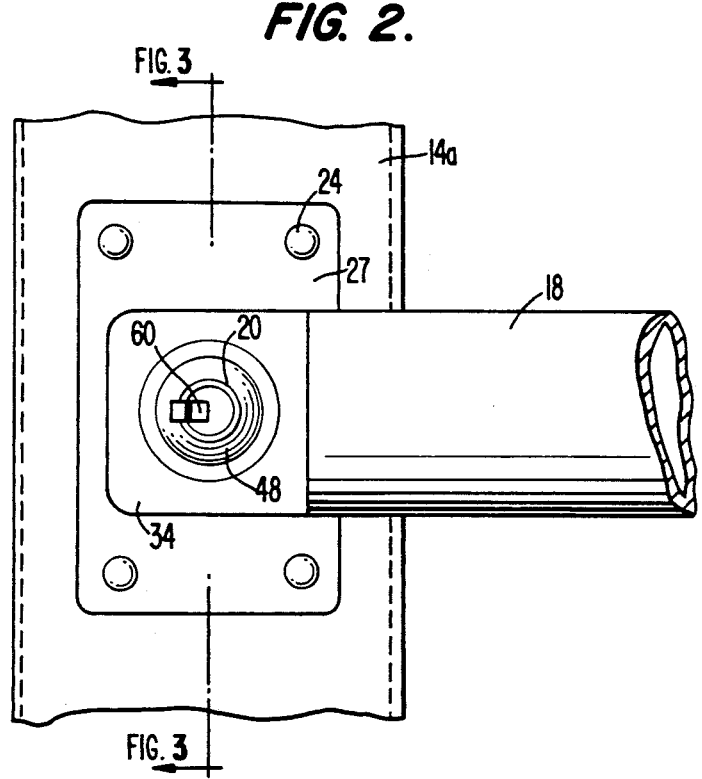
FIG. 2 is a side view of the connecting device of the present invention showing a shaft hitched to a harness saddle.
Figure 3:
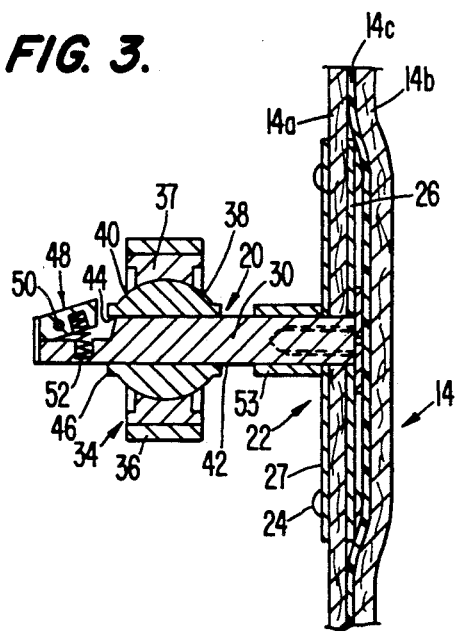
FIG. 3 is a cross-sectional view showing the connecting device of the present invention taken at line 3—3 of FIG. 2.

It will be understood that, in hitching the horse to the sulky, two identical connecting devices 18 are employed. Each is mounted on the saddle 14 on either side of the horse and attaches to one of the shafts. For simplicity, however, only one connecting device will be described in connection with one sulky shaft. As shown in FIGS. 2 and 3 each of the connecting devices 18 attaches to a harness pin assembly 20 firmly secured to the saddle 14, preferably above the midline of the horse's side, by a mounting means 22.

The saddle 14 usually is made of sturdy leather formed, as shown in FIG. 3, of an outer strap 14a and an inner strap 14b with a formed plastic cushion 14c between the straps. The harness pin assembly 20 is fastened to the saddle 14 with suitable bolts 24, although rivets or the like may be used. The mounting means 22 includes a first metal mounting plate 26 provided with suitable through holes for insertion of the bolts 24 used to secure the mounting plate 26 to the saddle 14. A harness pin 30, made a strong corrosion resistant metal, such as a stainless steel, is secured to the mounting plate. The inner end of the elongated, cylindrical harness pin 30 is affixed to the mounting plate 26, for example, by welding, and the pin projects outwardly from the mounting plate at an angle of approximately 90'. In affixing the harness pin assembly 20 to the saddle it is advantageous to position the mounting plate 26 on the inner side of the strap 14a, i.e., the side toward the horse, and to place a second mounting plate 27 opposite the first plate on the outside of the saddle for added rigidity. The fastening bolts 24 and harness pin 30 pass through appropriate holes punched in the outer strap 14a and the harness pin assembly is thereby secured to the saddle.

Each of the connecting devices 18 includes a hollow elongated sleeve member 32 having a forward portion 32a (extending toward the horse's head) and an adjoining rear portion 32b (extending toward the sulky). Attached to the forward end 33a of the forward portion 32a of the sleeve 32 there is a connector assembly 34 for connecting the sleeve member 32 to a harness pin on a saddle.

The rear portion 32b of sleeve 32 has a longitudinal hollow extending from its rear end toward the forward portion 32a for receiving the forward end of a sulky shaft. Typically the sleeve member 32 has an elliptical cross section and is formed of a high tensile strength tubing, for example, aircraft steel tubing made of S.A.E. 4130 Cr-Mo steel. The front portion 32a typically is about eight inches long, while the rear portion 32b is typically about 12 inches long, and both portions are formed of a single piece of the elliptical steel tubing. The rear portion 32b is provided with a plurality of spaced-apart laterally extending throughholes in 36 through the walls on opposite sides of the tubing, i.e., through-holes on both the inside and outside of the sleeve. Typically, there are five such sets of lateral through holes of 154 " diameter and spaced longitudinally along the sleeve at 2 ⅜".

Figure 4A:
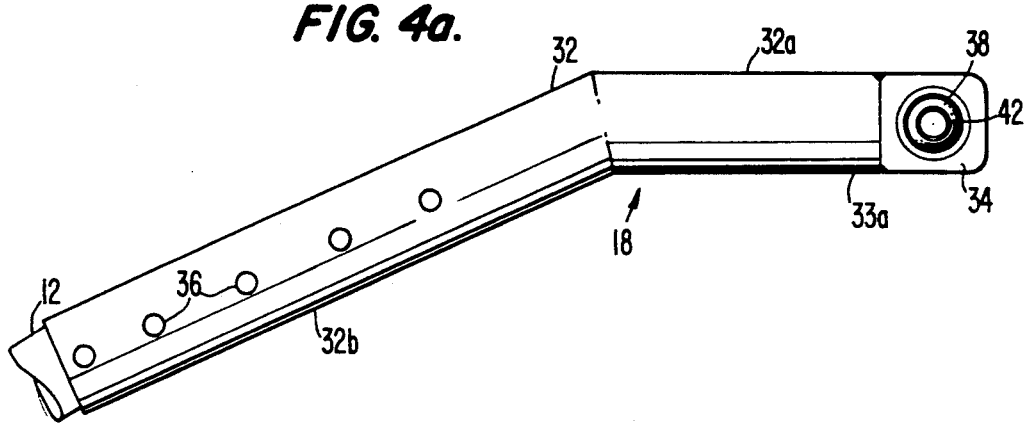
FIGS. 4a and 4b are views from the side and top, respectively, of the connecting device of the present invention.
Figure 4B:
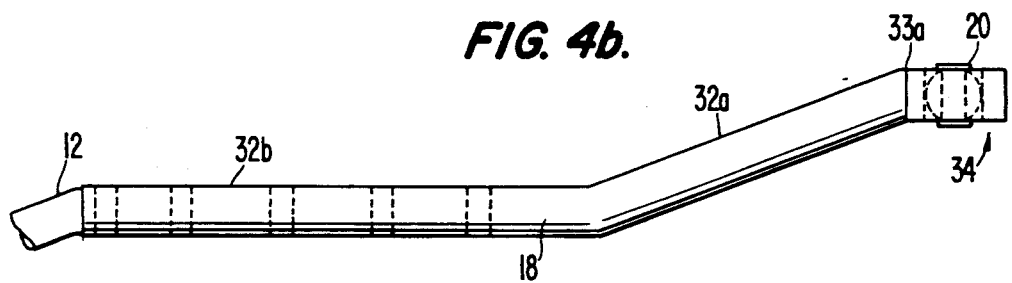

As shown in FIGS. 4a and 4b the sleeve 32 is bent at the junction of forward portion 32 and rear portion 32b, so longitudinal axes intersect each other at an angle. Preferably the portions extend from each other in both the horizontal and vertical planes. That is, the forward portion 32a of the sleeve 32 is offset and angles inwardly and downwardly from the rear portion 32b. When the sleeve is viewed after being fitted into the forward end of a sulky shaft. The housing member 34 has a generally rectangular, or box-like, configuration and, when viewed from the side, extends forward of front end 33a substantially in alignment with forward portion 32a, but, when viewed from the top, extends from front end 33a substantially along a line parallel to rear portion 32b.

It is also preferred that the forward end portion of each of the sulky shafts is likewise offset inwardly and downwardly from the rear portion of the shaft. Lateral through holes are provided spaced along the forward end portion of each shaft so that one or more align with one or more corresponding through holes 36 of the sleeve 32 when the sleeve is properly fitted onto the shaft. One or more pins, e.g., a bolt and wing-nut, are placed through the through holes in the sleeve and shaft to secure the sleeve on the shaft.

The purpose of the horizontal offsets in the sleeve and in the shaft is to keep the shafts from hitting the sides of the horse hitched to the sulky. Similar vertical offsets can be employed to obtain the desired slope of the shafts from the point of connection to the harness to the point of connection on the sulky. The above-mentioned through holes in the sleeve 32 can be aligned, as desired, with various through holes on the shaft according to the size of the horse to be hitched to the sulky.

Each of the connecting devices 18 also includes a connector assembly 34. The conductor assembly 34 includes a housing member 36 secured to the front end 33a of sleeve 32, preferably by welding. The housing member 36 is formed of steel or other suitable metal and is provided with a ball-retaining aperture means 37 which includes a central circular bore 38 extending through the housing member and having an axis which is substantially perpendicular to the housing member 36. A steel ball member 40 is rotatably held in circular bore 38 so as to be free to swivel, or rotate, therein in all directions. Preferably, the inner surface of bore 38 is provided with friction-reducing seating material, such as Teflon or another suitable resin, to facilitate the rotation of the ball 40. Preferably, bore 38 is stepped on both sides of the housing member 34, the bore having a first smaller diameter at its outer ends which permits the desired degree of rotation of the ball 40 and a second, larger diameter at its interior which is suitable for retaining the ball 40 in the aperture. The ball member 40 is a rounded steel ball provided with a cylindrical aperture means 42 which includes a central core hole 44 passing through the ball and a circular lip, or collar, 46 on each side of the ball surrounding the periphery of the core hole 44. Collars 46 are coaxial with the longitudinal axis of core hole 44 and extend along this axis from the ball a pre-selected distance. This type of swiveling ball joint is known in the machine art as a "high misalignment" ball joint.

The distance by which collars 46 extend from the outer edges of core hole 44, in conjunction with the diameter of the aforementioned smaller diameter of the bore 38 will determine the degree to which ball 40 may rotate in the housing intersecting the longitudinal axis of core hole 44, collars 46 will strike the inner surface of the smaller diameter portion of bore 38 and thereby limit such rotation.

Such a "high misalignment" ball joint provides a significant advantage over a ball joint using a fully rounded ball.

The configuration of the harness pin 30 is extremely significant to the utility of the device of the present invention. The diameter of core hole 44 through of the ball joint has a close tolerance, for example, a 0.002" tolerance in relationship to the diameter of the harness pin 30. This close tolerance allows for precise steering for the harness racing driver and a more intimate sense of "feel" and control when negotiating in close quarters in racing situations. In short, this close tolerance, coupled with the ability of the ball joint to rotate relative to the shaft provides the desired precision in driver control over the horse.

To facilitate inserting the harness pin 30 into the core hole 44, the outer end of the pin 30 is provided with a slight taper. The locking device is preferably of the positive locking type. That is, after the harness pin 30 is fully inserted in the central core hole 44 of ball 40, the ball cannot be removed from the harness pin except by positively releasing the locking device Further, the locking device is of the type which is normally in the locked position and a positive action, e.g., a manual action, is required to unlock it so as to permit the ball 40 to be removed from the harness pin 30 by sliding the ball over the outer end of the harness pin.

As disclosed in the above-mentioned Boutilier patent application, one suitable locking device comprises a plurality of locking ball bearings positioned in the harness pin 30 near its outer end and spaced around and extending from its periphery. This type of device is known in the art for its utility in close tolerance, high precision work where an object has to slide along a shaft. It provides absolute locking control once the connector assembly 34 is slid from the outer end of the harness pin over the retracted locking ball bearings, a plunger released to its normally-locked position and the connector assembly 34 is positioned between the ball bearings and the saddle. The locking ball bearings are activated to the unlocked point by depressing a plunger extending longitudinally from the end of the harness pin 30.

Another particularly suitable locking device 48 is shown in FIG. 3. This locking device comprises one or more, preferably a plurality of, extensible wing members 50 pivotably attached at their outer end to the harness pin 30 near its outer end. A spring 52 urges the inner end of each wing member outwardly from the harness pin 30 so that after the pin and locking device are inserted into and through the central core hole 44, the inner end of each wing member 50 is extended outwardly from the circumference of harness pin 30 to its normally locked position where the ball 40 cannot slide off the outer end of the harness pin, so that the connecting assembly 34 is positively locked onto the harness pin. When the wing member(s) 50 is manually depressed and retracted against the harness pin, the ball member 40 can be slid over and off of the harness pin to quickly release the sulky shaft from the harness. This type of attachment is of great importance to horsemen who frequently use the same sulky in multiple races on a given racing program and have to make a rapid detachment of a sulky from the harness on one horse and equally rapid attachment of the same sulky to the harness on another horse.

An advantage of the locking device 48 shown in FIG. 3 is that the wing members 50 retract easily when the ball 40 is slid onto a harness pin 30 when hitching the sulky, but once the pin 30 and locking device 48 are slid through the ball 40, the wing members lock tighter as pressure is applied against them. The harness pin 30 extends outwardly approximately $\frac{3}{8}''$ beyond the locking ends of the wing members 50, and this end of the pin is tapered to permit easy starting into the core hole 44 of ball 40 when hitching the sulky.

There is no extra action required to put the connector assembly 34 on the pin 30 other than slipping it over the harness pin, and the lock automatically retracts while the ball goes on the pin. To hitch the sulky, the shafts are brought into position on either side of the horse, the core hole 44 is centered over pin 30 and pushed into place, first one side and then the other. To remove the sulky, the spring loaded wing member (or members) are pushed in, even with the pin's periphery. Then, the connector assembly is pulled off pin 30. This action on both sides removes the sulky from the harness. A feature important to the utility of the invention is the height and angle of the harness pin 30 as it protrudes from the harness 14. It is essential to the utility of the invention that the connector assembly 30 be able to slide freely along the harness pin. This requires that the harness pin 30 be mounted at an angle of substantially 90' to the base plate of the harness. Any substantial deviation of this angle of the harness pin in relation to the base plate may produce binding of the ball joint's movement along the harness pin, thus reducing the utility of the device.

Further, experimentation has shown that vertical positioning of the harness pin as it protrudes from the horse's harness, in relation to the contour of the horse's side is also very important In general, it may be said that the utility of the device is greatly enhanced if the mounting plate is mounted above the mid-line of the horse's side, so that the harness pin shaft will normally be pointed upward at an angle of from 10°-70° above horizontal as it protrudes from the harness in position on the horse.

The length of the harness pin protruding from the harness plate has been found to be critical in two respects. First, and most obviously, the pin must protrude far enough beyond the locking device in the harness pin itself so that the locking device can be locked and unlocked when the connector assembly 34 mounted on the sulky shaft is brought into position to be slid onto or off the harness pin 30 during the process of hitching or unhitching the horse.

Second, it has been found important that the distance from the inner edge of the housing member 34 to the mounting plate 27 on the harness should be in the range of about 1-3/16" to 1 $\frac{1}{4}''$ (if the mounting plate is on the outside of the harness) A spacer 53, preferably a rubber bushing approximately $\frac{3}{4}''$ long, is employed to insure that the connector assembly 34 is kept away from the side of the horse by at least this distance. This is critically important in producing one of the advantages of the device over conventional sulky harness arrangement, namely, to insure that the sulky shafts are held away from the shoulders of the horse. The spacer 53 allows approximately $\frac{3}{8}''$ of sliding movement by the connector assembly 34 along the harness pin 30 between the spacer and the locking device 48 in the harness pin. If the connector assembly 34 is held further away from the side of the horse than the range of 1 3/16" to 1 $\frac{1}{4}''$, the benefits of the invention are reduced, as the long (up to 7 feet) flexible sulky shafts transmit a swaying, fishtailing motion toward the rear, and thus to the main frame of the sulky. This, in effect, creates the very type of instability which the present invention was designed to eliminate.

By comparison, if the spacer 53 is substantially reduced in length or eliminated, and if the locking device 48 is moved closer to the mounting plate 27, the sulky shaft will be held too close to the horse and the connector assembly will not have sufficient opportunity to slide along the shaft, thus preventing full utilization of the ball joint movement and creating a more rigid relationship between harness and sulky shaft, approaching the conditions experienced with conventional sulky harness connections.

The effects of too rigid a relationship between harness and sulky shaft are several. Most importantly, such a relationship will transmit the vector force of a turning horse backward along the sulky shaft in such a fashion that the wheels of the sulky go around a turn in a series of minute slide, catch, slide, catch actions of the wheels in a direction transverse to the turning radius of the horse's body as it goes around a turn of a racetrack. This produces a notable "chattering" sensation when rounding a racetrack turn, and significantly reduces the efficiency of the horse's pulling movement.

Additionally, a too rigid relationship between sulky shaft and harness, which causes the shaft to be confined too closely to the side of the horse, will cause the tip of the sulky shaft to press against the horse's inside shoulder while rounding a turn. This impedance is irritating to a horse, sometimes causing the horse to break stride while either pacing or trotting, and tending to force the horse to run straighter, and thus to the outside of the turn. This, obviously, has the ultimate effect of causing the horse to take a wider turn than is necessary, costing yards and time in competitive racing situations.

As previously indicated, conventional strap-held harnesses require a three point contact between the harness and each sulky shaft. The device of the present invention, however, requires only one such contact, or pivot point, per shaft. This single pivot point per shaft contributes significantly to the smoothness of turn, freedom from chatter and shoulder irritation described above.

The present invention can, as mentioned above, be attached or detached from a horse extremely rapidly. This feature is especially important in the event of an accident, such as a fallen horse during a race.

With a conventional harness, it is virtually impossible to free a fallen horse rapidly from his leather straps, without cutting the harness or requiring the horse to stand. During a race, there is frequently no time to get any heavy duty cutting implement to cut the leather harness. Frequently the sulky, harness, and horse will be so intertwined that it is impossible to extract the horse rapidly. Since harness races are frequently conducted on tracks of ½ to ⅝ mile, and the horses make two revolutions around the track, an accident which sends a horse down during a race can pose a very serious threat of injury, not only to the fallen horse and its driver, but also to the other competitors in the race and their horses. The ability to simply retract the radial extension from the harness pin and free a sulky shaft from relationship to the horse is a strong safety benefit inherent in the present invention.

Further, the present invention, through use of the high misalignment swivel joint, eliminates the possibility of the feared "catapult" or "slingshot" effect if a horse stumbles and falls forward at high speed with a sulky fastened by conventional harness. During a race, harness horses may attain speeds of 30 miles per hour or more. If a horse suddenly stumbles forward, the rigid connection between a conventionally harnessed horse and the sulky trailing behind it has the effect of hurling the seat end of the sulky, and the driver seated thereon, forwardly in an arch over the back of the falling or fallen horse. In effect, the driver literally becomes the equivalent of a rock in a sling-slot or catapult. Many very serious injuries have resulted from drivers being catapulted either onto the track where they may become trampled by passing horses, or onto or in front of their own fallen horses which are frantically trying to get up. With a rigidly bound, conventional harness, there is nothing to absorb the kinetic energy created by the sudden reduction of forward speed from 30 miles per hour to zero, except to hurl the driver through the air.

By contrast, the high misalignment joint in the present device absorbs this kinetic energy, due to its capacity to swivel a full 360°. Since the momentum of the falling horse is not transmitted through the swivel joint to the shaft of the sulky, the rear or seat end of the sulky will remain on the ground, with a much reduced risk of injury to the driver of the fallen horse.

Another positive feature of the present invention is the consistency associated with the permanently fixed components of the harness pin-connector assembly, in contrast to the varying position of the sulky shafts in relation to the horse when the horse is harnessed with leather straps which are subject to expansion and contraction under varying race and whether conditions.

Another control feature of the present device is that, when using the present invention, the sulky can consistently be connected to the horse's harness with the same comparative position between the back end of the horse and the sulky seat. Some horses pull especially hard on the reins at all times. With a conventional harness, it is frequently necessary to hitch such horses to the sulky at the very end of the sulky shaft, allowing maximum room between the rear of the horse and the sulky seat. This is so, because the driver must pull extra hard on the reins to restrain the horse. If the sulky shaft were connected to the harness too far toward the seat (driver's end) of the sulky, the cross member of the sulky would be struck by the horse's rear legs while in motion, thus causing potential serious injury to the back of the horse's rear legs. The alternative is to adjust the sulky shaft to suit the size of the horse being used.

Finally, the comfort derived from use of the present invention is not only highly useful in obtaining better racing performance from harness horses, it may make the difference between the ability of such horses, particularly young ones to stay "on gait" or not, whether pacing or trotting. If a horse cannot remain on gait, it is not allowed to race competitively, and his economic value to his owner is greatly diminished. It has been observed that the far greater freedom of movement of the horse while hitched to the sulky by means of the present invention, coupled with the fact that the sulky shafts do not protrude into the horse's shoulders in a turn, have combined to make competitive, soundly-gaited race horses out of a number of animals who were previously thought to be only "problem children" without any racing potential.

A racing sulky made with special designed shafts, such as in FIG. 4, that are offset to keep the shafts from hitting the sides of the horse. These shafts can either be telescoping for adjustment or solid.

Having described a preferred embodiment of the present invention, it will be understood that variations and modifications thereof falling within the spirit and scope of the invention will become apparent to those skilled in the art and the scope of the invention is to be determined by the appended claims and their equivalents.

What is claimed is:

1. A device connecting a sulky shaft to a horse harness, comprising:
   a baseplate mounted on the harness,
   a pin projecting substantially perpendicularly outwardly from the baseplate,
   a sleeve mounted on the end of the shaft,
   a socket mounted to the end of the sleeve,
   a ball mounted within the socket for rotational movement and having a central aperture for receiving the pin, and
   a latch member carried by the outer end of the pin and biased angularly outwardly form the pin so as to be cammed sufficiently inwardly by insertion of the pin into the ball to permit passage of the pin and latch member through the aperture, and to spring outwardly upon such passage to prevent removal of the pin from the ball until the latch member is manually moved inwardly sufficiently to permit removal of the pin from the ball, thereby facilitating attachment of a sulky to a horse and preventing accidental detachment therefrom.

2. The device of claim 1, wherein the sleeve mounts the ball substantially centrally of the end thereof to maintain maximum spacing of the shaft from the horse during rotation of the ball within the socket.

3. The device of claim 1, including a spacer carried by the pin between the ball and the baseplate to space the shaft from the horse and enable free movement of the ball within the socket.

4. The device of claim 3, wherein the spacer is resilient and spaces the ball approximately 1 3/16 to 1 ¼ inches from the baseplate.

5. The device of claim 1, wherein the sleeve has a rearward portion attached to the end of the shaft, a free end portion mounting the socket and ball, and an angled intermediate portion interconnecting the other portions to offset the rearward portion and its attached shaft horizontally outwardly from the pin and its attached harness and horse.

6. The device of claim 5, wherein the sleeve is longitudinally adjustable relative to the shaft to enable variable spacing of the sulky from the horse.

7. The device of claim 5, wherein the sleeve mounts the ball substantially central within the end thereof to maintain maximum spacing of the shaft from the horse in all positions of the ball during rotation within the socket.

8. A device connecting a sulky shaft to a horse harness, comprising:
   a baseplate mounted on the harness,
   a pin projecting substantially perpendicularly outwardly form the baseplate,
   a sleeve mounted on the end of the shaft,
   a socket rigidly mounted to the end of the sleeve,
   a ball mounted within the socket for rotational movement and having a central aperture for receiving the pin to connect the shaft directly to the harness, and
   a latch member carried by the outer end of the pin for releasably latching the ball to the pin to secure the shaft to the harness, wherein the sleeve mounts the ball substantially centrally of the end thereof to maintain maximum spacing of the shaft form the horse in all positions of the all during rotation within the socket.

9. The device of claim 8, wherein the sleeve is longitudinally adjustable relative to the shaft to enable variable spacing of the sulky from the horse.

10. The device of claim 8, including a spacer carried by the pin between the ball and the baseplate to space the shaft from the horse and enable free movement of the ball within the socket.

* * * * *

UNITED STATES PATENT AND TRADEMARK OFFICE
CERTIFICATE OF CORRECTION

PATENT NO. : 5,056,301

DATED : October 15, 1991

INVENTOR(S) : Carl C. Garland et al.

It is certified that error appears in the above-identified patent and that said Letters Patent is hereby corrected as shown below:

In Claim 1:

Col. 10, line 46, "form" should read --from--

In Claim 7:

Col. 11, line 10, "central" should read --centrally--

In Claim 8:

Col. 12, line 10, "form" should read --from--

Col. 12, line 11, "all" should read --ball--

Signed and Sealed this

Twenty-third Day of February, 1993

Attest:

STEPHEN G. KUNIN

Attesting Officer

Acting Commissioner of Patents and Trademarks